UNITED STATES PATENT OFFICE.

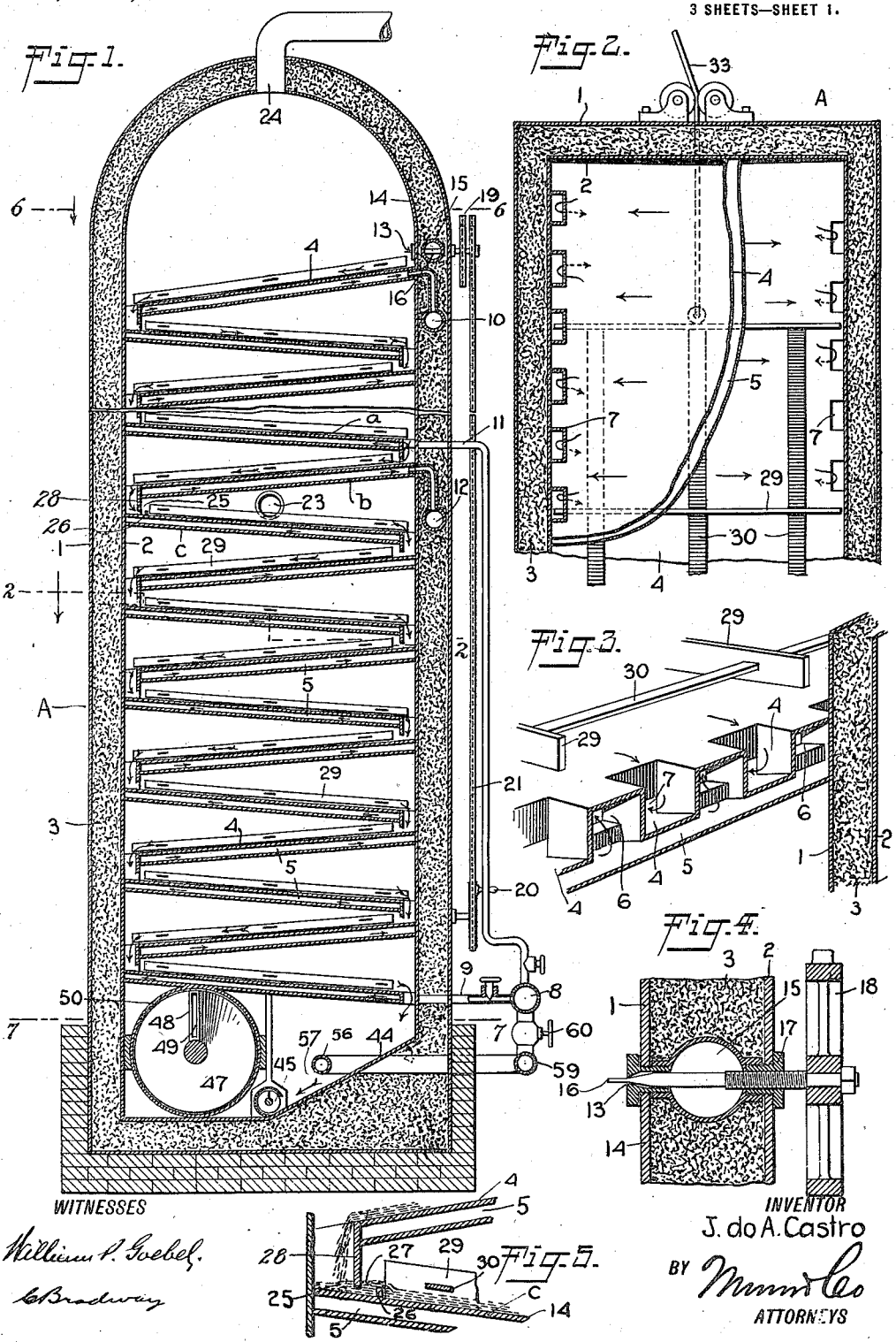

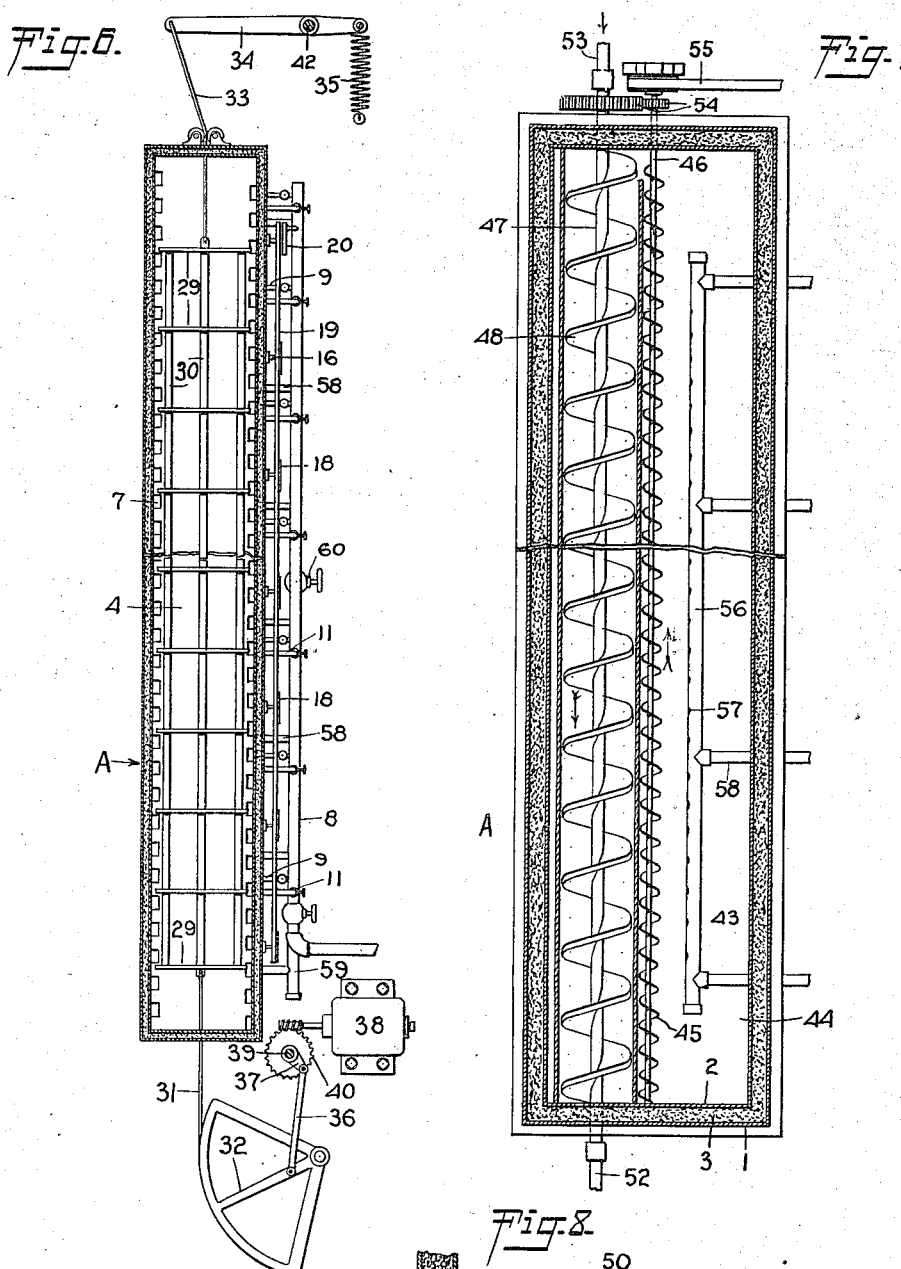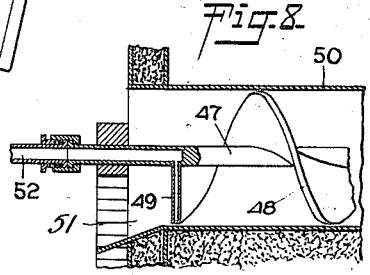

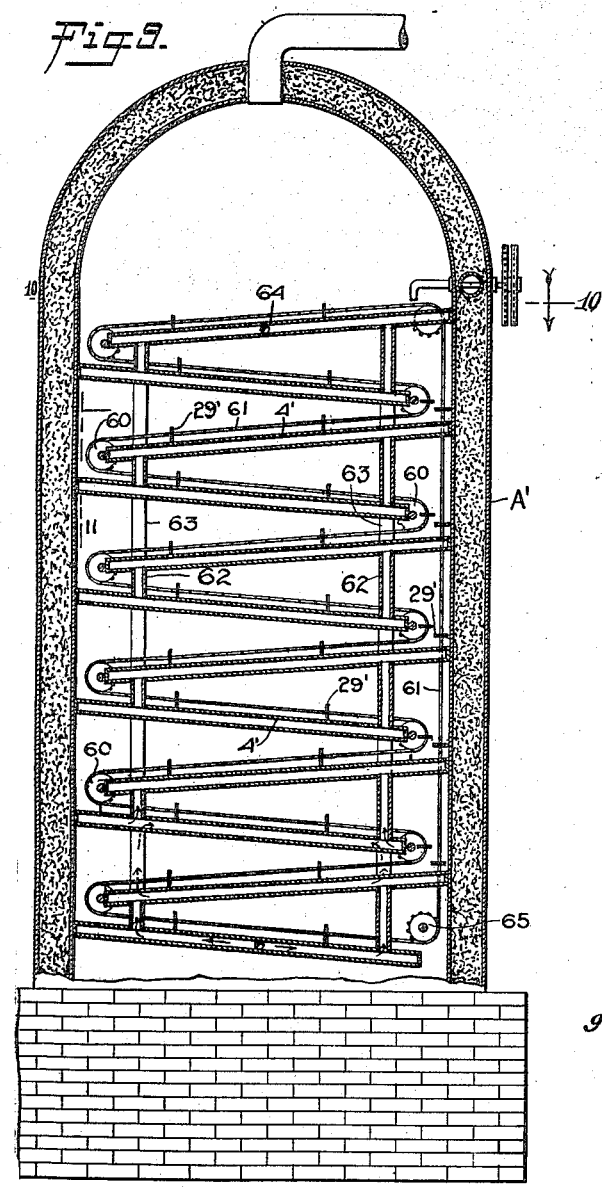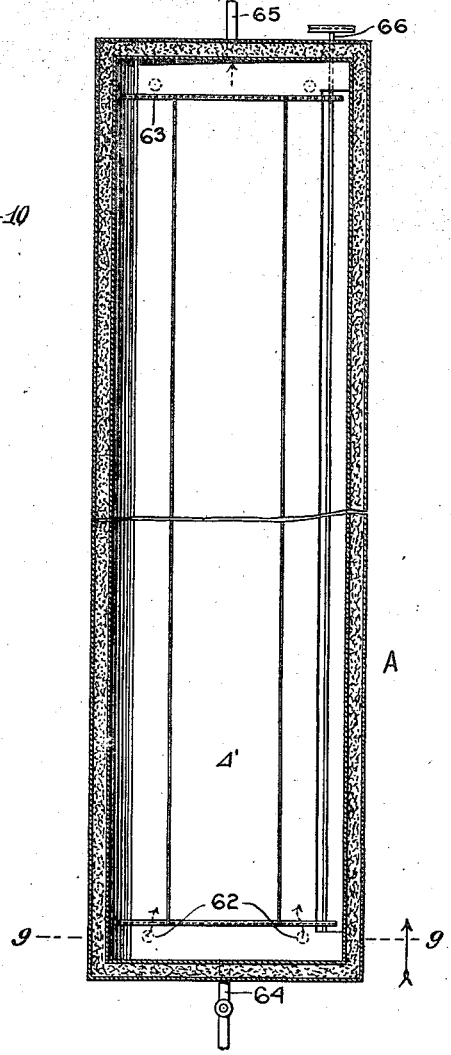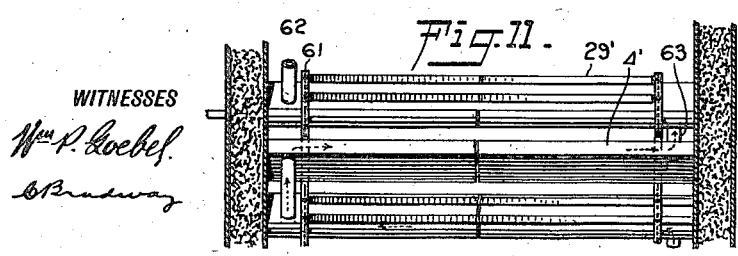

JOAO DO AMARAL CASTRO, OF SAO PAULO, BRAZIL.

CONTINUOUSLY-OPERATING VACUUM-EVAPORATOR.

1,193,359.  Specification of Letters Patent.  Patented Aug. 1, 1916.

Application filed December 17, 1915. Serial No. 67,390.

*To all whom it may concern:*

Be it known that I, JOAO DO AMARAL CASTRO, a citizen of the Republic of Brazil, and a resident of Sao Paulo, Brazil, South America, have invented a new and Improved Continuously-Operating Vacuum-Evaporator, of which the following is a full, clear, and exact description.

This invention relates to vacuum pans for evaporating sugar juices and other liquid, and the invention has for its general objects to improve the construction of vacuum pans so as to be continuously in operation and hence of large capacity, easily controlled, and so designed as to take up comparatively little space, considering the output of the device.

A more specific object of the invention is the provision of a vacuum pan in which the liquid flows continuously down an inclined plane having a gentle slope and which is steam or otherwise heated underneath so as to evaporate the liquid flowing down the plane, and at the same time the upper surface of the liquid is subjected to heat by reason of the surrounding air or atmosphere being of high temperature, thereby increasing the rate of evaporation.

A further object is the provision of a novel arrangement of scraping means on the inclined plane, whereby the material will not cake thereon but be kept in a constant free state, so that it can flow down the incline.

A further object is to provide a continuously operating vacuum pan composed of superimposed oppositely inclined shelves or surfaces whereby the liquid passes successively from one to the other, each shelf being provided with a chamber through which hot air or steam passes to thereby act on the liquid flowing down on the top surface of the shelf, and the heat radiated from the chambers of the shelf also acts on the thin film of flowing liquid on the shelves so that both the top and bottom surfaces of the films of flowing liquid will be subjected to an evaporating action. These shelves have scraping means to prevent the caking of the evaporated material thereon.

Another object is to provide a novel means for controlling the heat of the chambered shelves according to the nature of the material being evaporated, the shelves being serially connected in groups, and each group being connected with a source of steam and controlled by a valve whereby the supply of steam can be regulated. And furthermore, the interior of the vacuum pan can be connected at different heights with a vacuum pump so as to facilitate the drawing off of the vapors from the material being evaporated.

As a further object the invention provides novel means at the base of the vacuum pan for continuously discharging the evaporated material and at the same time subjecting the same to a cooling action.

With such objects in view, and others which will appear as the description proceeds, the invention comprises various novel features of construction and arrangement of parts which will be set forth with particularity in the following description and claims appended hereto.

In the accompanying drawings which illustrate certain embodiments of the invention and wherein similar characters of reference indicate corresponding parts in all the views, Figure 1 is a vertical section of the apparatus with an intermediate portion broken away; Fig. 2 is a horizontal section on the line 2—2, Fig. 1; Fig. 3 is a sectional perspective view of the construction of the lower end of a shelf or incline; Fig. 4 is a sectional view of one of the valves for supplying the liquid to be evaporated. Fig. 5 is a detail view of the trap between the upper and lower section of the vacuum pan; Fig. 6 is a horizontal section on the line 6—6, Fig. 1; Fig. 7 is a horizontal sectional view on the line 7—7, Fig. 1; Fig. 8 is a detail sectional view of the cooling and discharging means for the evaporated stock; Fig. 9 is a vertical section of a modified form of vacuum pan taken on the line 9—9, Fig. 10; Fig. 10 is a horizontal section on the line 10—10, Fig. 9; and Fig. 11 is a detail vertical sectional view on the line 11—11, Fig. 9.

Referring to the drawing, A designates the housing or casing of the vacuum pan, which housing may be of any desired length, height or width, and in the present instance it is shown made up of inner and outer shells 1 and 2 with a filling of insulating material 3. In the housing A are superimposed shelves or inclines 4 arranged alternately in opposite inclination so that the material will flow down one shelf and discharge from the lower end thereof to the upper end of the next shelf, and so on until the material being evaporated discharges from the bottom shelf. Each shelf 4 has a chamber 5 extending throughout its area, so that a heating medium, such as steam or hot air can flow through the shelves and heat the liquid flowing down the same. The bottom of each shelf radiates heat downwardly to act on the top surface of the film of liquid flowing down on the next shelf below it, so that the heating action on the flowing film of liquid is from above and below simultaneously, whereby an effective evaporation is produced. The shelves are connected in series by passages 6 uniting the lower end of one shelf with the upper end of the next shelf below it. These passages 6 are spaced apart, and between them are passages 7 whereby the material flowing down one shelf can discharge onto the next shelf. In the present arrangement the lowermost shelf or incline receives steam or any other heating medium from a header 8 which has valved connections 9 with the lowermost shelf, and the steam rises successively through the chambers of the various shelves and discharges through an outlet 10 connected with the uppermost shelf, said outlet being open to the atmosphere through a siphon or equivalent trap not shown. If desired, however, the shelves may be arranged in groups, and the lowermost shelf of the upper group will be connected by valved pipes 11 with the steam header 8, such lower shelf being indicated at $a$, in Fig. 1. The shelf $b$ next below it will have a trapped outlet 12 for the steam to escape to the atmosphere. By this arrangement one or more groups of evaporating shelves can be heated according to the nature of the material being evaporated. The material to be evaporated is discharged upon the upper end of the uppermost shelf in the vacuum pan and flows down in a direction counter to the flow of steam, so that the material is progressively reaching hotter and hotter regions, until the point of discharge is reached. The material is supplied through orifices 13 in the wall 14 of the housing, and these apertures communicate with a horizontal header 15, and they are controlled and kept clean by needle valves 16 which are threaded in bushings 17 and extend out of the housing, where their outer ends are provided with sprocket wheels 18 or equivalent means. All of the sprocket wheels are connected together by an endless chain 19, whereby all the valves are opened or closed at the same time, and since these valves are located at a high point they can be operated from the base of the vacuum pan by a sprocket wheel 20 that is connected by a sprocket chain 21 with a sprocket wheel 22 on the stem of one of the valves 16.

The housing or casing A of the vacuum pan may have separate connections 23 and 24 with a vacuum-producing means so as to maintain a vacuum in the housing. The connection 23 is shown at a much lower level than the top connection 24, whereby the vapor can be effectively drawn off from all the parts of the vacuum pan. At the shelves above and below the vacuum connection 23 is a trap 25 so that the upper and lower sections of the housing can be sealed or separated from each other. This trap is shown clearly in Fig. 5, and consists of a dam 26 on the upper end of the shelf $c$, whereby the material being treated will be dammed up as indicated at 27, and the wall 28 extends into this dammed-up material so that an effective seal is produced.

It is essential that the film of material flowing down the shelves be kept constantly agitated so as not to cake on the shelves, and for this purpose each shelf has a series of scrapers 29 which are spaced bars resting edgewise on the top surfaces of the shelves and extending with their length in the direction in which the shelves incline, and these scrapers are connected together by straps or equivalent connecting elements 30. As shown in Fig. 6 the outermost scraper 29 at one end is connected by a rope or equivalent means 31 with a rocking sector 32 for producing movement of the scrapers in one direction. The outermost scraper at the opposite end is connected by a rope 33 with a lever 34 which has a spring 35 and by means of this spring the scrapers are moved in the opposite direction. The sector 32 is oscillated by a pitman 36 connected with a crank 37 which is rotated by a suitable motor 38. Cranks 37 are mounted on a vertical shaft 39 that has a pinion 40 meshing with a worm 41 on the shaft of the motor 38. The levers 34 are also mounted on a vertical shaft 42 which is disposed at the side of the apparatus opposite from the shaft 39, and consequently the scrapers on all the shelves will move simultaneously, the scrapers moving transversely to the flow of the material down the shelves so that the scrapers will not retard this flow.

In the bottom of the housing or casing is a receiving chamber 43 that has an inclined bottom 44 whereby the material discharged from the lowermost shelf will flow down the inclined bottom 44 to a screw or equivalent conveyer 45 which conveys the material longitudinally of the chamber 43 to a point 46 at one end, as shown in Fig. 7, where the material passes into a large screw conveyer 47 which has a spiral web 48 which has a hollow 49 so that cold water or other cooling medium can flow through the web and cool the hot evaporated material. The screw conveyer 47 is housed in a duct 50 which has a discharge outlet 51 at one end. The shaft of the screw conveyer has inlet and outlet conduits 52 and 53 that communicate with the hollow web 49, so that cooling medium can flow therethrough. The conveyers 45 and 47 are connected by gears 54, Fig. 7, and power is applied by suitable means 55. In the chamber 43 is a steam discharge pipe 56 having apertures 57 whereby jets of steam can be admitted to the apparatus for the purpose of cleaning the same, the steam pipe 56 having connections 58 with the header 59 connected by a controlling valve 60 with the header 8.

Referring to the modification shown in Figs. 9 to 11 inclusive, the inclined shelves or evaporating pans 4' in the casing A' are alternately oppositely inclined, as in the previous construction, but they are modified to accommodate a different form of scraping mechanism. In the present instance the scraping mechanism is an endless device whereby the scraping bars 29' pass successively over the shelves and return from the lowermost shelf to the upper shelf, and the circuit is again repeated. The scraping bars 29' move down the shelves or in the direction of the flow of the material. At the upper and lower edges of the shelves are sprocket wheels 60 around which pass the endless elements 61 to which the scraping bars 29' are connected. From the lowermost shelf or pan the sprocket chains or endless elements 61 pass upwardly along one wall of the casing A' to the upper edge of the uppermost shelf or pan. To permit the scraping bars to pass from one shelf to the next the lower ends of the shelves are spaced from the adjacent walls of the casing, and consequently the active part of the scraping mechanism has a zigzag form corresponding to the disposition of the shelves or pans 4'. Alternate pairs of shelves are connected together at one end by risers 62, while the intermediate pairs of shelves are connected together by risers 63. In this manner the chambers of the shelves or pans are connected in series relation, so that steam entering the lowermost shelf through the pipe 64 will rise successively through the pans or shelves and discharge through an outlet pipe 65. By this arrangement a single driving shaft 66 is sufficient to operate the whole scraping mechanism, and each shelf or pan will not require an independent scraper. The apparatus will have suitable means in the bottom thereof to cool and convey away the evaporated material.

From the foregoing description taken in connection with the accompanying drawings, the advantages of the construction and method of operation will be readily understood by those skilled in the art to which the invention appertains, and while I have described the principle of operation, together with the apparatus which I now consider to be the best embodiment thereof, I desire to have it understood that the apparatus shown is merely illustrative and that such changes may be made when desired as fall within the scope of the appended claims.

Having thus described my invention, I claim as new and desire to secure by Letters Patent:

1. A vacuum evaporator comprising a plurality of superimposed inclined shelves or pans down which the liquid to be evaporated flows from the top to the bottom, each pan having a chamber, and the chambers being connected together in series relation, and means connected with the lowermost pan for supplying heat thereto, whereby the heat rises successively through the chambers in a direction counter to the flow of the cold liquid down the pans.

2. A vacuum evaporator comprising a chamber, means for connecting the chamber with a vacuum-producing device, shelves or pans arranged in superimposed relation and alternately oppositely inclined, whereby the liquid to be evaporated flows successively down the shelves, means for supplying the liquid to the uppermost shelf, said shelves having chambers, means connecting a certain number of chambers in series, means for connecting certain other chambers in series, separate means for supplying a heating medium to the series of chambers independently, and separate outlets for the series of chambers.

3. A vacuum evaporator comprising a chamber, means for connecting the chamber with a vacuum-producing device, a plurality of chambered shelves or pans arranged in superimposed relation and alternately oppositely inclined, means for connecting the chambers of the shelves in series relation, means for producing a flow of a heating medium through the shelves, means for supplying the heating medium to the lowermost shelf, whereby the heating medium flows upwardly, means for supplying the material to be evaporated to the uppermost shelf whereby the said material flows downwardly over the shelves successively and in a direction opposite to the flow of the heating medium, and scrapers movable on the top surfaces of the shelves to keep the material free therefrom.

4. A vacuum evaporator comprising a chamber, means for connecting the chamber with a vacuum-producing device, a plurality of chambered shelves or pans arranged in superimposed relation and one discharging on the other, means for connecting the chambers of the shelves in series relation, means for producing a flow of a heating medium through the shelves, means for supplying the material to be evaporated to the uppermost shelf, scrapers movable on the top surfaces of the shelves to keep the material free therefrom, and means at the bottom of the chamber cooling and carrying away the evaporated material.

5. A vacuum evaporator comprising a chamber, means for connecting the chamber with a vacuum-producing device, a plurality of chambered shelves or pans arranged in superimposed relation and one discharging on the other, means for connecting the chambers of the shelves in series relation, means for producing a flow of a heating medium through the shelves, means for supplying the material to be evaporated to the uppermost shelf, scrapers movable on the top surfaces of the shelves to keep the material free therefrom, and a screw conveyer internally cooled for cooling and conveying away the evaporated material.

6. A vacuum evaporator comprising a chamber, means for connecting the chamber with a vacuum-producing device, a plurality of chambered shelves or pans arranged in superimposed relation and one discharging on the other, means for connecting the chambers of the shelves in series relation, means for producing a flow of a heating medium through the shelves, means for supplying the material to be evaporated to the uppermost shelf, scrapers movable on the top surfaces of the shelves to keep the material free therefrom, a compartment in the bottom of the chamber for receiving the evaporated material, a conveyer for conducting away the material as it accumulates in the compartment, and a large screw conveyer receiving material from the first-mentioned conveyer and having means for cooling the evaporated material.

7. A vacuum evaporator comprising a chamber, means for connecting the chamber with a vacuum-producing device, a plurality of chambered shelves or pans arranged in superimposed relation and alternately oppositely inclined, means for connecting the chambers of the shelves in series relation, means for producing a flow of a heating medium through the shelves, means for supplying the material to be evaporated to the uppermost shelf, scrapers movable on the top surfaces of the shelves to keep the material free therefrom, a compartment in the bottom of the chamber for receiving the evaporated material, a conveyer for conducting away the material as it accumulates in the compartment, a large screw conveyer receiving material from the first-mentioned conveyer and having means for cooling the evaporated material, and a steam jet pipe disposed in the compartment for permitting the first-mentioned conveyer to be cleaned by steam.

8. A vacuum evaporator comprising a tall structure having a chamber, a conduit connected with the chamber for maintaining a vacuum therein, superimposed shelves or pans in the chamber and discharging one upon another, a plurality of valves for supplying the material to be evaporated to the uppermost shelf, means for heating the shelves for evaporating the material flowing down the same, and means for connecting the valves together for simultaneous opening or closing movement.

9. A vacuum evaporator comprising a tall structure having a chamber, a conduit connected with the chamber for maintaining a vacuum therein, superimposed oppositely inclined shelves or pans in the chamber, a plurality of valves for supplying the material to be evaporated to the uppermost shelf, means for heating the shelves for evaporating the material flowing down the same, means for connecting the valves together for simultaneous opening or closing movement, and mechanism operable from the base of the structure for actuating the valves.

10. A vacuum evaporating apparatus comprising a tall structure having a chamber, superimposed pans or shelves so arranged that material flows successively down the same from one to the other, a trap between certain of the shelves whereby the chamber is divided into separate compartments, and means connected with each compartment for connecting the latter with a device for maintaining a vacuum in the compartments.

11. A vacuum evaporating apparatus comprising a tall structure having a chamber, superimposed pans or shelves so arranged that material flows successively down the same from one to the other, a trap between certain of the shelves whereby the chamber is divided into separate compartments, means connected with each compartment for maintaining a vacuum therein, and means for heating the shelves to evaporate the material flowing down the same.

12. A vacuum evaporating apparatus comprising a tall structure having a chamber, superimposed pans or shelves so arranged that material flows successively down the same from one to the other, a trap between certain of the shelves whereby the chamber is divided into separate compartments, means connected with each compartment for maintaining a vacuum therein, and separate means for heating the shelves in the separate compartments.

In testimony whereof I have signed my name to this specification in the presence of two subscribing witnesses.

JOAO DO AMARAL CASTRO.

Witnesses:
C. BRADWAY,
G. H. EMSLIE.